J. KIRKWOOD.
HOSE VALVE.
APPLICATION FILED MAR. 31, 1914.
1,121,847.
Patented Dec. 22, 1914.
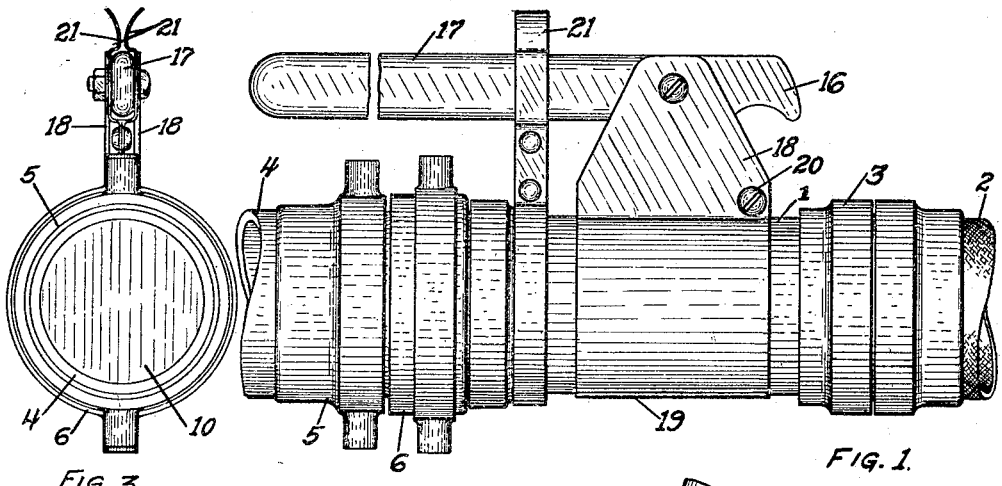
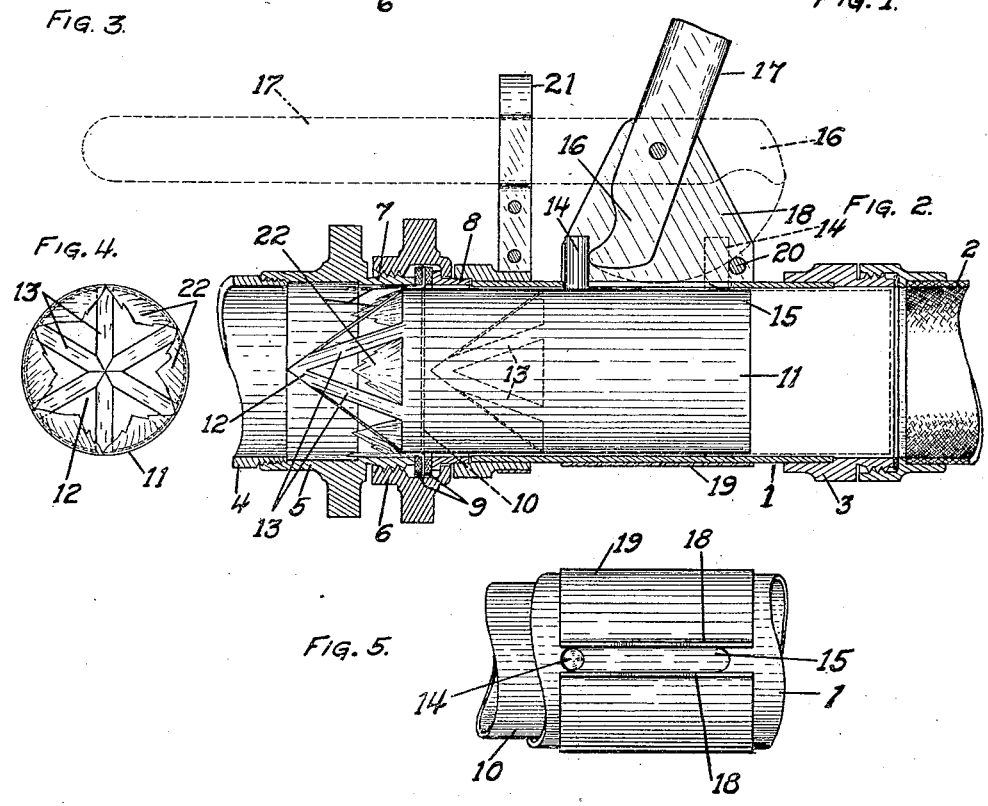
WITNESSES:
Newton E. Blake
William E. Bagg.
INVENTOR.
JOHN KIRKWOOD
BY
Thos. J. Whittlesey
ATTORNEY.

UNITED STATES PATENT OFFICE.

JOHN KIRKWOOD, OF LENOX, MASSACHUSETTS.

HOSE-VALVE.

1,121,847.	Specification of Letters Patent.	Patented Dec. 22, 1914.

Application filed March 31, 1914. Serial No. 828,502.

*To all whom it may concern:*

Be it known that I, JOHN KIRKWOOD, a citizen of the United States, residing at Lenox, in the county of Berkshire and State of Massachusetts, have invented certain new and useful Improvements in Hose-Valves, of which the following is a specification.

The present invention relates to valves, and is more particularly designed for emergency use in connection with fire hose to extinguish incipient fires, although I do not wish to be understood as limiting the utility and scope of the invention thereto.

The primary object of the invention is the provision of improved means for sealing water, or other fire-extinguishing fluid, in suitable receptacles and for releasing the same in time of emergency.

My device may be used in conjunction with the ordinary check-valve, which should be kept open at all times, except such temporary period ensuing after the fire has been extinguished when it becomes necessary to shut off the flow of water and remove my device for repairs.

The device essentially comprises a casing having an inlet for attachment to a source of water supply and an outlet for attachment to a hose, a water-tight frangible member diametrically arranged therein for closing the inlet, and suitable apparatus for rupturing the closure to release the water quickly in emergency.

In the drawings accompanying this application I have shown a preferred form of embodiment of my invention, wherein—

Figure 1 is a side elevation of the device assembled and operatively attached to pipe and hose connections, which are shown in part; Fig. 2 is a vertical longitudinal section of the device after being operated to release the water, the original positions of the parts actuated being indicated in dotted lines; Fig. 3 is a rear-end view of the device; Fig. 4, a rear-end view showing the movable sleeve in process of rupturing the mica closure of the casing; and Fig. 5, a bottom view of the central portion of the device, disclosing the opening in the wall of the casing, the ends of the casing, sleeve, and jacket extensions being cut away.

As shown, the tubular casing 1 is connected at its outlet end to a hose 2 preferably by a threaded bushing 3 shrunken onto the casing, and is connected at its inlet end to a water supply-pipe 4 preferably by a detachable bushing 5 secured to the casing by a threaded bridge-coupler 6 which unites an exteriorly threaded extension 7 provided on the bushing 5 to a separate extension bushing 8 permanently secured in detachable relation to the casing, the walls of said extension 7 and bushing 8 being arranged in alinement and provided with a somewhat larger inside diameter than the casing, for reasons hereinafter explained. Said coupler 6 is adapted to adjust the positions of the extension 7 and bushing 8 with respect to each other, said extension and bushing being arranged to form a water-tight joint by means of a pair of interposed gaskets 9, 9, disposed face to face and separated by a diametric disk 10 of mica, or other suitable frangible water-proof material, which forms a closure across the inlet end of the casing.

Forward of the disk 10 and within the casing 1, is shown a tubular sleeve 11 which is open at both ends and adapted to slidably fit into the casing, the rearward end 12 of the sleeve having a pointed formation of open conical structure preferably formed by a plurality of metal bars 13, 13, etc., arranged at equal intervals around the end of the body of the casing and inclined rearward and inward to meet at a common point coincident with the axis of the sleeve. The several openings provided in effect between the bars 13, 13, etc., afford ample space for the free passage of water through the casing.

Exteriorly provided on the wall of the sleeve 11 is a thrust-pin 14 arranged to extend through a longitudinal slot 15 provided in the wall of the casing 1 and into position for engagement by the foot 16 of a lever 17 when actuated as hereinafter described, said lever being carried on the casing and preferably pivoted between oppositely arranged lateral extensions or wings 18, 18, disposed on opposite sides of the slot 15 and forming the ends of a jacket 19 inclosing the casing, said wings being further secured together by a transverse screw 20 at their bases. The handle of the lever 17 when at rest is secured in detachable relation between oppositely arranged clamping springs 21, 21, secured in vertical positions on the casing and conveniently arranged to receive the lever 17 for support at the limit of its rearward movement. When the lever 17 is detached from the springs 21, 21, the foot 16 comes into contact with the thrust-pin 14 of the sleeve 11, which is actuated rearward, the continued movement of the lever causing the point 12 of the sleeve to penetrate and rupture the mica disk 10 and causing an opening therethrough by which the water in the pipe 4 is released, the forward limit of movement of the lever being predetermined by the length of the slot 15 and sufficient to permit a complete fracture of the mica disk whose several resulting segments 22, 22, etc., are raised into engagement with the wall of the bushing extension 7 and occupy the space provided between such extension and the sleeve 11 when thus advanced.

The disk 10 is proportioned in strength to effectually resist the pressure of the water in the pipe 4 and is ruptured by the action of the sleeve 11 only in time of emergency. After service, the broken disk should be replaced by a new one, which is done by detaching the casing 1 from the pipe 4 and the removal of the gaskets 9, 9.

It is desirable that all parts of my device, with the exception of the frangible disk, which are subjected to contact with the water from the supply pipe, should be constructed of brass or other suitable material which will not rust nor deteriorate from moisture.

Among the chief advantages of a valve of the foregoing description are its constant readiness for instant action, the simplicity, accuracy and swiftness of its operation, and the fact that it may remain inactive for an indefinite period of time without impairment to its utility.

I claim:—

1. In hose valves, the combination of an outer tubular member having an inlet and an outlet, a frangible closure diametrically arranged within said tubular member, an inner tubular member having an inlet and an outlet and arranged to slide within said outer tubular member, and reciprocatable means for imparting to said inner tubular member a rapid thrusting movement toward said closure whereby one end of the inner tubular member is projected through said closure.

2. In hose valves, the combination of a tubular casing having an inlet and an outlet, a frangible member diametrically arranged within the casing for closing the inlet, a slidable tubular member movably disposed within the casing and having a pointed element at one end arranged opposite said closure, and reciprocatable means for imparting to said slidable member a rapid thrusting movement toward said closure, the movements of said slidable member causing the said pointed element thereon to penetrate through said closure.

3. In valves, the combination with a casing having an inlet and an outlet and a lateral opening through its wall, and a frangible closure for closing the inlet, of a member movably disposed within the casing and having an arm extending through said lateral opening, and manually operable means provided externally of the casing for actuating said arm within said lateral opening in the direction of the inlet end of the casing, said movements of said arm being adapted to cause the movable member within the casing to rupture said closure.

4. In valves, the combination with a casing having an inlet and an outlet and a longitudinal opening in its wall, and a frangible member for closing the inlet, of a movable member within the casing having a lateral arm extending through said opening in the casing and a pointed element at one end arranged for engagement with said frangible member, and manually operable means provided exteriorly of the casing for actuating said arm and movable member to rupture said frangible member.

5. In valves, a tubular casing having a longitudinal slot in its wall, a frangible disk for closing one end of the casing, and means for rupturing the disk including a slidable member within the casing and having a pointed end opposite the disk, a thrust-pin carried laterally on the slidable member and extending through said slot, and a lever carried exteriorly on the casing to engage the thrust-pin for actuating the pointed end of said slidable member against said disk.

6. In hose valves, a tubular casing having a longitudinal opening in its wall, a frangible disk arranged diametrically within the casing to close one end of the casing, a movable sleeve within the casing and open at one end and having a conical member of open structure at the opposite end opposite the disk, said sleeve having a lateral extension extending through said opening in the casing wall, and a pivotally actuable lever carried exteriorly on the casing and arranged to engage at one end with said sleeve extension for actuating the conical member on said sleeve through the disk.

7. The combination in a valve for firehose, of a tubular casing having an inlet adapted for attachment to a water supply pipe and an outlet adapted for attachment to a hose, a water-proof frangible member transversely arranged within the casing for closing one end thereof, and manually operable mechanism for rupturing said frangible member, said mechanism including a pointed movable member, slidably arranged within the casing, and means for imparting a rapid thrusting movement to said pointed member.

In testimony whereof I hereunto affix my signature in presence of two witnesses.

JOHN KIRKWOOD.

Witnesses:
 JNO. J. WHITTLESEY,
 WILLIAM E. BAGG.

Copies of this patent may be obtained for five cents each, by addressing the "Commissioner of Patents. Washington, D. C."